Feb. 3, 1942.  A. L. TOBIN ET AL  2,271,516
FLUID PRESSURE RELIEF VALVE
Filed Sept. 5, 1940
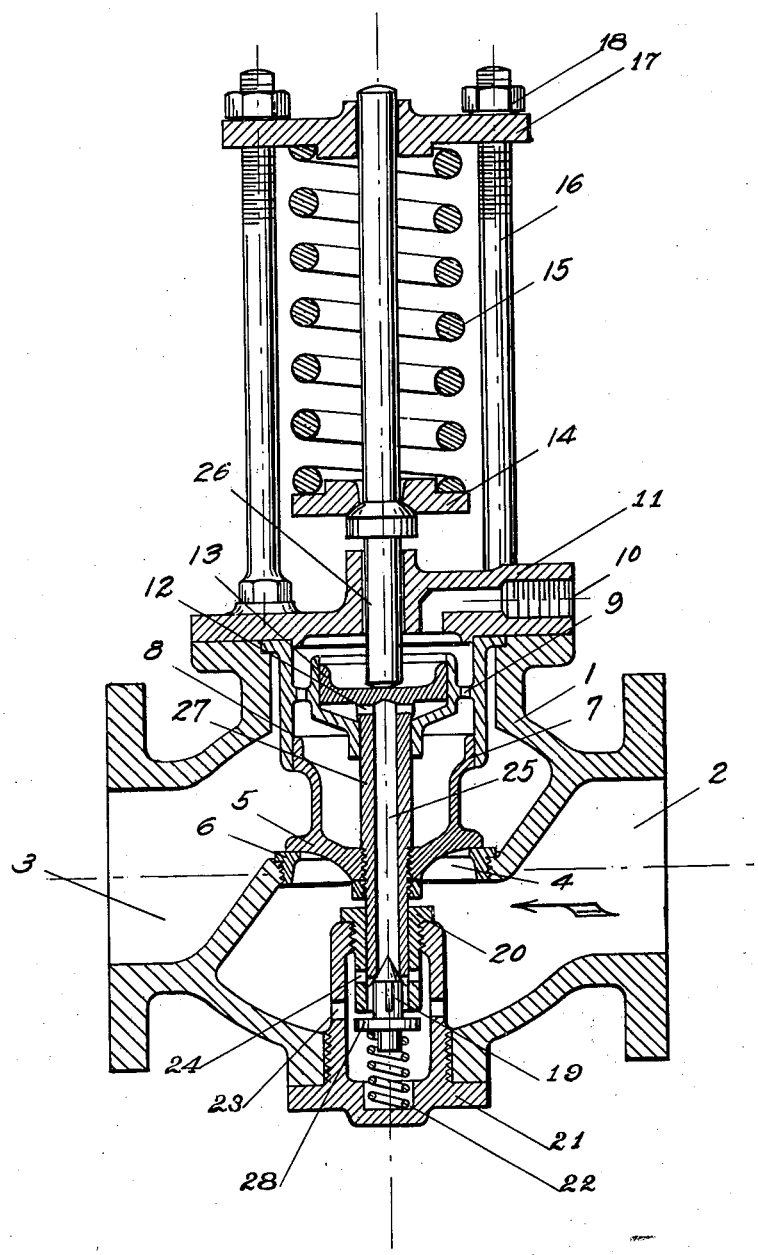
INVENTORS.
Arthur L. Tobin
James L. Kimball Patented Feb. 3, 1942

2,271,516

UNITED STATES PATENT OFFICE 2,271,516

FLUID PRESSURE RELIEF VALVE

Arthur L. Tobin, Lynnfield, and James L. Kimball, Danvers, Mass., assignors to Ruggles-Klingemann Mfg. Co., Salem, Mass.

Application September 5, 1940, Serial No. 355,470

10 Claims. (Cl. 137—53)

This invention relates to a fluid pressure relief valve for relieving pressure from a high pressure source into the atmosphere or to a lower pressure. The main object being large volume capacity with small rise in pressure. Another object is to accomplish high volume capacity without so called—blow back—effect which blows the pressure down below the relieving point of the valve. A further object is to accomplish these results in a self-contained valve of simple construction, and of low manufacturing cost.

In the conventional type of relief valve, the power to open the valve is the rise in pressure above the relieving point, while in this invention, the total pressure acting on a booster piston assists in the opening. Where the power to open the valve is limited to the rise in pressure above the relief point, it is obvious that the higher the pressure, the heavier must be the spring loading, and, consequently the volume capacity of such high pressure relief valves is limited to a low lift characteristic.

As an example, assuming the valve is adjusted to start to relieve at 100 lbs. and must pass a given volume of steam at a pressure not exceeding 105 lbs. We now have a rise in pressure of 5 lbs. to get the valve open the required amount, but the spring loading must be for 100 lbs. Therefore, the lift of the valve is relatively limited due to the high gradient of the hold down springs.

In our invention, under a similar requirement, when the 100 lbs. setting is exceeded, and the valve starts to lift, then the inlet pressure up to 100 lbs. is available to operate the booster piston to open the valve. In this way, instead of having 5 lbs. rise to open the valve, we have available 100 lbs. This not only means that a very much larger volume of steam can be relieved, with the same size valve, but it also means that the rise in pressure above the relieving point can be kept down to a minimum.

This invention also has advantage over the conventional pop safety valve used to limit steam pressure in boilers, and other steam vessels, in that no steam is wasted, as in these pop safety valves, due to blow back effect, only the pressure above the setting of the valve is relieved to the atmosphere.

Relief valves are commonly used on extraction lines in connection with bleeder turbines, and for this service a substantial saving can be made, not only in the use of a smaller size valve, but also reduced cost of pipe connections necessary to discharge this steam to the atmosphere.

The structure herewith disclosed should not be confused with what is commonly referred to as pilot operated relief valves. We are well aware of the fact that relief valves operated by a pressure actuated pilot valve are old in the art, but such valves have astatic tendencies, being unstable in their opening and closing operation, and also have a blow back characteristic, as in pop safety valves, closing at a much lower pressure than that which caused the opening operation. Such valves are objectionable for a great many services, as for example, when applied to turbine bleeder lines, where direct make-up steam regulators are in use, such blow back effect may cause these make-up regulators to open, thereby feeding the relief valves and preventing them from closing. It is one of the objects of this invention to avoid such unstable operation and blow back effect, and this will become apparent as the description thereof proceeds.

Referring to the drawing, which is a vertical sectional view of the relief valve, 1 is a valve casing having inlet 2 and outlet 3. A seat ring 6 defines an orifice 4 for allowing fluid pressure to pass from the inlet 2 to outlet 3. A main valve 5, normally closes orifice 4. A valve bonnet cover 11 closes the top of valve casing 1, and has tie rods 16 and spring adjusting plate 17 for adjusting the tension of spring 15 by means of adjusting nuts 18. Spring 15 is seated at its lower end on spring plate 14, which is mounted on hold down stem 26.

This far we have described the necessary parts which go to make up a conventional type of pressure relief valve. Arranged in the upper part of valve casing 1 is a cylinder 8 which is adapted to receive a cylindrical extension of the main valve 5 in the form of a piston 7 at its upper end, said piston being of approximately the same diameter as the main valve 5.

This piston has a working fit within the cylinder 8 and is for the purpose of balancing the outlet pressure on the main valve 5. The pressure which may leak past the piston 7 into the cylinder 8 and cylindrical extension is vented through ports 9 and pipe connection 10 to the atmosphere.

In case the valve is used to discharge into a pressure higher than the atmosphere, then this connection 10 is piped into this higher pressure.

A second cylinder is arranged within the cylinder 8 located concentrically with respect to the larger cylinder, and to orifice 4, and is an integral part thereof, said cylinder being adapted to receive a booster piston 13, having a working fit within the smaller cylinder and operatively connected with main valve 5. The upper side of this smaller piston is also vented to the atmosphere or to a lower pressure, as the case may be. Valve stem 27 connects piston 13 with main valve 5 and defines a tubular passage 25 extending from the lower end of said stem to a point under piston 13 and has ports 12 connecting said passage 25 with the under side of piston 13.

At the lower end of valve stem 27 is a secondary valve 19 which is arranged by means of a spring 22 to close said passage 25 when the main valve 5 is closed on seat ring 6.

Valve casing 1 has an opening at its lower end which is closed by means of guide cover 21 having guide bushing 20. This guide bushing 20 acts as a lower guide for valve stem 27 and also provides a guide for the secondary valve 19.

Port holes 23 in the guide cover 21 and 24 in the guide bushing 20 provide passages for the supply of fluid pressure to operate booster piston 13 when the main valve 5 lifts away from the secondary valve 19. The amount of lift is determined by the distance between flange 28 on valve 19 and the bottom of guide bushing 20.

In the operation of our improved relief valve, an increase in pressure at the inlet 2 of valve casing 1 above a predetermined amount, determined by the adjustment of the hold down spring 15, allows the main valve to open an amount proportional to the increase in pressure in relation to the gradient of the hold down spring 15. On an increase in pressure which would effect a lift of the main valve 5 in excess of the movement of valve 19, flange 28 contacts with the bottom of valve guide bushing 20 allowing valve stem 27 to lift away from its seated position on valve 19 which allows the valve inlet pressure to pass through ports 23 and 24 and up through passage 25 and through ports 12 to under the booster piston 13 causing a lift of valve 5 in excess of that due to its initial proportional lift.

The result of this excess lift is to greatly reduce the rise in pressure, above the relieving point, necessary to discharge the required volume of fluid pressure and this is accomplished in a stable manner free from pulsating or blow back effect. As an example, when the booster piston becomes effective to increase the lift of the valve, the pressure under the main valve, due to the higher lift, is reduced and consequently the higher lift is compensated for but on a lower gradient characteristic than that of its initial lift. On the other hand, the closing operation like that of the opening operation, is accelerated to the point where the secondary valve is closed and from this point to a closed position of the main valve, a wider gradient effect is encountered which stabilizes the closing operation and prevents so-called blow back effect.

It is well known that in any type of spring loaded relief valve, the pressure at the point of least cross section across the seat is only 58% of the pressure at the inlet of the valve with the valve in open position. This reduction in pressure from 100% starts somewhere back of the valve seat on the upstream side depending on the degree of opening of the valve. Consequently, there is a loss of pressure directly back of the periphery of the disc, the prepotency of power being maintained only at the center section. This characteristic of the direct acting relief valve greatly reduces its capacity without an excessive rise in pressure at the inlet. Applicants' invention overcomes this objection in that the pressure to operate the booster piston is taken at a point removed from the valve disc seat.

It should be understood that our invention is not to be limited to the exact details of construction shown and described. For example, the booster piston 13 and secondary valve 19 could be located entirely outside of the valve casing 1 with the piston 13 connected to the hold down stem 26 and with pipe connections from the inlet of the valve to the secondary valve 19. Furthermore, the invention is not limited to pressure relief valves alone, but includes all forms of our invention which come within the scope of the appended claims.

We claim:

1. In a valve structure comprising, in combination, a main valve operative on a predetermined first pressure to effect an opening proportional to a second pressure higher than the first pressure, fluid pressure motive means including a secondary valve in the inlet of the main valve and operated by the first named valve on a predetermined amount of opening thereof to accelerate the opening of the main valve at a rate greater than that due to said first named proportional opening and resilient means cooperating to close the secondary valve in advance of the closing of the main valve.

2. In a fluid pressure relief valve comprising, in combination, a valve structure having an inlet and an outlet, a valve disc for normally preventing fluid pressure flow from the inlet to the outlet, yielding means allowing said disc to open a predetermined amount proportional to the initial increase in pressure above a predetermined value, means co-operating with said disc including a piston and a secondary valve located at the inlet side of the valve disc and operated by the valve disc, to apply pressure to said piston to accelerate the opening of said disc an amount greater than that due to the said initial proportional opening and additional yielding means between the secondary valve and the valve structure.

3. In a fluid pressure relief valve comprising, in combination, a valve structure having an inlet and an outlet, a main valve normally preventing fluid pressure flow from the inlet to the outlet, spring loading means allowing said main valve to open an initial amount proportional to an increase in pressure above a predetermined setting, means including a piston and a secondary valve located at the inlet side of said main valve and operated by the main valve to apply pressure from the inlet of said valve structure to said piston on a predetermined amount of opening of the main valve to accelerate the opening of said main valve an amount greater than said initial proportional opening and resilient yielding means cooperating to close the secondary valve in advance of the closing of the main valve.

4. In a fluid pressure relief valve comprising, in combination, a valve structure having an inlet and an outlet for the passage of fluid under pressure, a main valve for normally preventing fluid pressure flow from the inlet to the outlet, spring loading means for normally holding said valve closed and to allow said valve to open above a predetermined pressure an initial amount proportional to the increase in pressure above said predetermined value, means co-operating with said main valve including a piston and a secondary valve located at the inlet side of said main valve and operated by the main valve to apply fluid pressure under said piston upon a predetermined opening of the main valve to accelerate the opening movement an amount greater than that due to said initial proportional opening and resilient yielding means cooperating to close the secondary valve in advance of the closing of the main valve.

5. In a fluid presure relief valve comprising, in combination, a valve structure having an inlet and an outlet for the passage of fluid under pressure, a spring loaded main valve adapted to prevent fluid pressure flow from the inlet to the outlet on a first pressure less than that required to open said main valve, and to permit said main valve to open an amount proportional to a second pressure higher than the first pressure, means co-operating with said main valve including a piston and a secondary valve located at the inlet side of said main valve and operated by said main valve to apply inlet pressure under said piston upon a predetermined amount of opening of the main valve to accelerate the opening movement of said main valve an amount greater than that due to said second pressure proportional opening and resilient yielding means cooperating to close the secondary valve in advance of the closing of the main valve.

6. In a fluid pressure relief valve comprising, in combination, a valve structure having an inlet and an outlet for the passage of fluid pressure, a spring loaded main valve adapted to normally prevent fluid pressure flow from the inlet to the outlet until a predetermined first pressure is reached, acting under said main valve, to cause said main valve to open an amount proportional to a second pressure higher than the first pressure, and means co-operating with said main valve including a fluid pressure servo motor and a secondary valve located in the inlet of said main valve and actuated by the opening of the main valve to apply inlet pressure to said servo motor to assist in the opening of the main valve an amount greater than said initial proportional opening and resilient yielding means cooperating to close the secondary valve at a predetermined position of the main valve in advance of its closed position.

7. In a fluid pressure relief valve comprising, in combination, a valve casing having an inlet and an outlet, a main valve seat defining an orifice for the passage of fluid under pressure from the inlet to the outlet, two cylinders located in the outlet of said casing positioned one within the other and arranged concentrically with respect to each other coaxial with respect to said orifice, a main valve adapted to normally close said orifice and having a cylindrical extension of substantially the diameter of said valve which forms a piston operative within the larger cylinder, a second piston within the smaller cylinder having a valve stem operatively connected with the main valve and defining a passage leading from the inlet side of said main valve to the under side of said second piston, a secondary valve located at the lower end of said passage adapted to close said passage when said main valve is closed and to admit pressure under said second piston upon a predetermined amount of opening of the main valve to accelerate the opening movement thereof, and spring loading means for holding both said main valve and secondary valve normally closed.

8. In a fluid pressure relief valve comprising, in combination, a valve casing having an inlet and an outlet for the passage of fluid under pressure, a main valve seat defining an orifice for the passage of fluid pressure from the inlet to the outlet, a spring loaded main valve for normally closing said orifice and adapted to allow said valve to open when a predetermined pressure has been reached under said valve, a cylinder having a piston therein located above the main valve in the outlet of said casing, said piston being operatively connected with the main valve by a stem as to form a unitary structure therewith, said stem defining a passage leading from the inlet side of said main valve to the said cylinder, valve means at the lower end of said stem arranged to close said passage through said stem when said main valve is closed and to allow fluid pressure from the inlet of said casing to the under side of said piston on a predetermined amount of opening of said main valve to assist in the opening thereof.

9. In a fluid pressure relief valve comprising, in combination, a valve casing having an inlet and an outlet, a main valve adapted to normally close an orifice between the inlet and the outlet, spring loading means for holding said valve in a closed position, a cylinder in the outlet of said casing coaxial with said main valve, a second cylinder of relatively smaller diameter within the first named cylinder and supported thereby, said main valve having a cylindrical extension forming a piston at its upper end operative within the larger cylinder, a main valve stem having a piston at its upper end operative within the smaller cylinder, both of said pistons having uppermost sides vented to the atmosphere, said stem defining a passage leading from the inlet side of said main valve to the underside of the smaller piston and a secondary valve at the lower end of said passage adapted to close said passage when said main valve is closed.

10. In a pressure regulating valve comprising, in combination, a valve casing having inlet and outlet compartments, a valve seat defining an orifice for the passage of fluid pressure from the inlet to the outlet, two cylinders located in the outlet of said casing positioned one within the other and arranged concentrically with respect to each other and coaxial with respect to said orifice, the larger of said cylinders having an open bottom end and the smaller cylinder an open top end, each of said cylinders being vented to the atmosphere, a main valve arranged to engage said valve seat and having a cylindrical extension forming a piston at its upper end operable within the open end of the larger cylinder, a piston operable within the smaller cylinder and having a stem connecting with the main valve, the pistons, valve and stem being arranged to form a single unitary construction, said stem defining a passage leading from the inlet side of said main valve to the under side of said smaller piston, a secondary valve arranged to close said passage when said main valve is closed and to allow fluid pressure from the inlet of said casing to pass to the under side of said piston on a predetermined amount of opening of the main valve.

ARTHUR L. TOBIN.
JAMES L. KIMBALL.